Aug. 22, 1939.   S. S. GREEN   2,170,753
ELECTRIC METER
Filed Dec. 14, 1935

Inventor:
Stanley S. Green,
By Louis Robertson
Atty.

Patented Aug. 22, 1939

2,170,753

UNITED STATES PATENT OFFICE 2,170,753

ELECTRIC METER

Stanley S. Green, La Fayette, Ind., assignor to Duncan Electric Manufacturing Company, La Fayette, Ind., a corporation of Illinois Application December 14, 1935, Serial No. 54,386

15 Claims. (Cl. 171—264)

This application relates to watt-hour electric meters, and more particularly to polyphase meters in which a plurality of meter discs are used for measuring different phases of the current.

In polyphase meters it is necessary to use a plurality of rotating discs in order to prevent conflict between the separate driving elements which are used for the separate phases unless a special meter disc construction is utilized, as disclosed in my Patent No. 2,110,417, issued March 8, 1938 on a co-pending application. Heretofore it has been common to mount two discs on one shaft, but the result has been a large and expensive meter element having about twice the height of the single phase element and requiring a correspondingly large base and a correspondingly large amount of wall space, both of which were very objectionable. There have been proposals to save some of the vertical space by mounting the two discs fairly close together, but this requires special driving magnet structures which are undesirable for commercial and technical reasons. It has also been proposed to, in effect, provide one disc annularly outside of the other disc, and in the same plane, but this not only increases the diameter of the disc undesirably but also results in a difference in the characteristics or action of the two elements which, of course, is very undesirable.

The present invention solves the problem by mounting conventional discs on spaced shafts which are so located that the discs overlap one another, preferably to the extent that each disc almost touches the shaft of the other disc. This permits the use of a single damping magnet acting jointly on the two discs and by mounting the discs one in front of the other the same base and the same amount of wall space may be used as for a single phase meter. At the same time there is, of course, complete independence of the two discs as far as the two driving elements are concerned.

One problem which must always be solved in polyphase meters is the problem of balancing the two measuring systems as to accuracy. Due to a lack of exact uniformity, which in commercial practice is inevitable, equal power consumptions measured by the two different driving elements will have slightly different effects unless some means is provided to compensate for this commercial lack of exact uniformity. Obviously, this compensation must affect one driving element, or its disc, and not the other. When the discs are mounted on a common shaft, this compensation cannot be obtained by adjustment of the damping magnets, since such damping magnet has the same damping effect on both discs since the discs must rotate together. According to the present invention, however, the damping is very easily accomplished simply by shifting the damping magnet system in a direction to increase its effect on one disc and decrease its effect on the other disc, the two discs being connected through a differential gearing which permits either to rotate without the other.

The objects of the invention are apparent from the foregoing discussion, but in summary they are to provide a satisfactory and compact polyphase meter having a plurality of elements operating on separate discs.

In the drawing, in which I have illustrated one example of such a meter:

Figure 1:
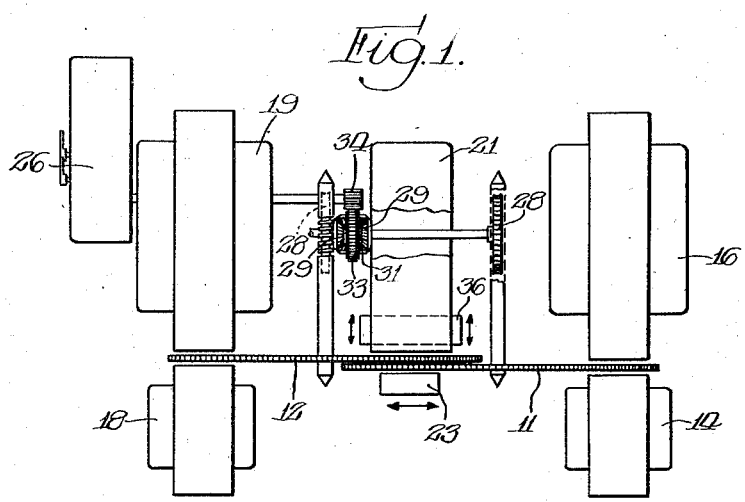
Fig. 1 is a diagrammatic illustration of my invention.

Although this invention may take numerous forms, only one has been chosen for illustration, and the diagrammatic representation may be taken as representing any form of the invention. In its broadest form the invention includes a plurality of meter discs 11 and 12 which are rotatably mounted in positions to overlap and each of which is driven by a separate meter element. Disc 11 is driven by a meter element which includes the current magnet 14 and the potential magnet 16. The meter disc 12 is driven in a similar manner by a current magnet 18 and a potential magnet 19. The rotation of the disk is opposed by one or more damping magnets 21, and, if a single damping magnet is used, it is preferably mounted on one side of the overlapping portions of the disk with a fixed or adjustable armature or magnetic flux carrier 23 mounted on the other side of the overlapping portions of the disc. The meter discs may drive separate registers, but preferably drive a single register 26. The gearing between the discs and the register is such that discs may be operated at different speeds and such that there will be a minimum variance in the frictional loss in the gearing. The preferred form of gearing which accomplishes this result involves worm gears 28 driven by the meter shafts and driving either directly or through intermediate gears the driving gears 29 of a differential gearing mechanism, which drive the planetary gears 31. The planetary gears 31 carry a ring gear 33 which drives a pinion 34 connected directly or through ordinary gearing with the register 26.

Inasmuch as rotation of the two discs is independent, it is possible to balance these discs, i. e., equalize their measurements, simply by adjusting the magnetic damping means. Perhaps the simplest method of accomplishing this is to shift the armature 23 either toward the center of disc 12 or toward the center of disc 11. When it is shifted toward the center of disc 11, it tends to concentrate the magnetism closer to the center of the disc 11 and closer to the periphery of the disc 12, with the result that the damping torque produced on the disc 12 increases while that on the disc 11 decreases. This, of course, follows from the fact that, if the flux remains the same, its torque on a disc will increase as its torque arm (leverage) with respect to the axis of the disc increases.

The mere balancing of the discs does not make them accurate, since they might both run too slowly or too fast. However, the speed may be easily controlled without interfering with the balancing action, by adjustment of a shunt 36 in a vertical direction. This shunt is, in general nature, similar to full-load adjustments found in other meters, its principle being to shunt a greater or lesser amount of the flux directly from one pole to the other of the damping magnets, this shunted flux being diverted from its normal path through the disks. As the shunt is moved away from proximity to the poles, it shunts less flux from the disks and the damping is increased. According to the present invention, this shunt is moved in such direction as to affect both disks equally and therefore does not disturb the balancing of the disks.

Figure 2:
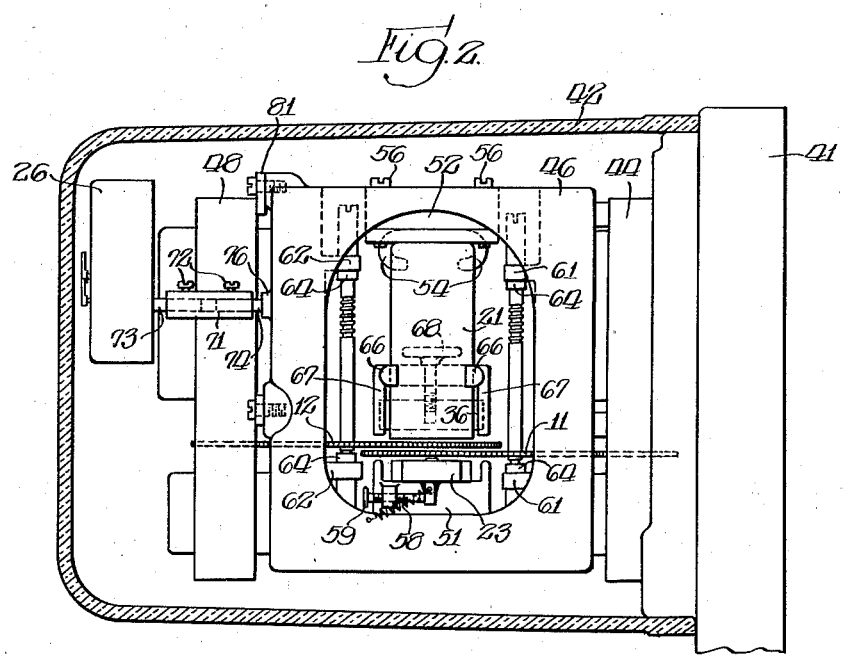
Fig. 2 is an elevational view, partly in section, showing one embodiment of the invention with the gearing omitted for simplicity.

In Fig. 2 has been illustrated one arrangement of the parts of the meter which is extremely advantageous because of taking up a minimum of wall space and permitting the use of conventional parts. A base 41 may be provided which may be any conventional base, such as one new used for single phase meters. The meter mechanism is mounted on this base and enclosed within a cover 42, preferably of glass, which may be secured on the base 41 in any manner, for example that illustrated in the Patent No. 2,046,307, issued June 30, 1936 to Frederick Holmes. This cover may be somewhat deeper than the conventional covers, but, being of the same diameter, does not require any additional wall space.

The meter mechanism may include a driving element 44 secured to the meter base 41, a frame 46 secured to driving element 44 or meter base 41, a second driving element 48 secured to the meter frame 46, as well as the other parts described in connection with Fig. 1. Each of the driving elements 44 and 48 is a composite structure including the potential magnet 16 and the current magnet 14. These driving elements may be of any form, such, for example, as that illustrated in my Patent No. 2,167,649, issued August 1, 1939 on a co-pending application.

The frame 46 may be a cast structure, preferably of aluminum, and includes a sliding seat block 51 for the armature 23 and a seat block 52 for the damping magnet 21. Of course, the damping magnet 21 and its armature 23 may be mounted in any desired manner. In the illustrated arrangement the damping magnet 21 is secured by a bracket 54 permanently secured to the magnet 21 and drawn tightly against the seat 52 by screws 56, and the armature 23 is pivoted at its far end and drawn tightly against the seat and toward one side by a spring 58, being accurately thrust toward the other side by a screw 59. The armature may be tapered with its larger end pivoted and its smaller end adjustable and smaller than the poles of the magnet 21 so as to permit its adjustment without moving it beyond the limits of the poles.

A pair of brackets 61 are formed integrally on the frame 46 for the shaft of the meter disc 11 and a pair of brackets 62 are likewise formed for the shaft of the meter disc 12. The shafts may be journalled in conventional bearing screws 64. If the discs are identical, they may be positioned one slightly above the other by positioning the brackets 61 slightly lower than the brackets 62, or by providing bearing screws which screw into the brackets different amounts. Of course, if preferred, the discs may be mounted at different heights on their shafts and the shafts journalled at the same height. The discs should be as close as is commercially practical to obtain maximum damping torque. Even with the two discs, the gap from magnet to armature may easily be as little as .100 to .125 inch.

For the sake of clarity, and since its arrangement is a mere mechanical expedient depending upon the shapes of the other parts of the meter, the gearing has not been illustrated in Fig. 2. It should be understood, however, that it could be that which is diagrammatically illustrated in Fig. 1 and that it could be supported either by brackets formed integrally on the frame 46, or by brackets, or a single structure including a plurality of bearings, attached to the frame 46 after other portions of the meter mechanism have been assembled. In connection with the assembly of the meter it should be recognized that the ends of the frame 46 are sufficiently open so that the discs with their shafts can be inserted through said ends. The damping magnet 21 may be inserted through the side opening illustrated.

The means of making the full-load adjustment is shown rather diagrammatically, although it illustrates one form in which this adjustment could be made. Secured to the damping magnet 21 near its poles is a non-magnetic bracket member 66 which may be secured in place by a pressing operation. It may include a pair of guide members 67 at each end between which the shunt 36 slides vertically, this shunt being operated by screws 68 riding on the central portion of bracket 66, or in any other desired manner. The magnet 21 is preferably so mounted that, when it has been removed, it may be replaced in exactly its original position so that the adjustment will not be changed. The use of a bracket member 54 permanently secured to the magnet, as by a pressing operation, accomplishes this result.

The register 36 may, of course, be any conventional register, and it may be secured in place in any conventional manner, although, if it is mounted on the frame 46, it may be desired to secure it by an insulating sleeve 71 having screws 72 engaging a stud 73 on the register 36 and a stud 74 on the frame. The purpose of this insulated mounting of the register 36 is to avoid forming a closed circuit around the pole of the driving element 48 if it should be found that in any particular meter such closed circuit had any undesirable effect. Of course, when the studs 73 pass on the outside of the entire driving element 48, as shown, there will probably be no undesirable effects from a closed circuit so studs 73 could be elongated and extend directly into an elongated socket 76 formed on the base, being secured therein by set screws.

In designing the meter, care must be taken to have both meter discs turn the ring gear 33 in the same direction. However, if identical meter elements are used having the same sides facing toward their disc axes, and if the worm gear threads are the same, this result will follow with the gearing illustrated. Although reference has been made to conventional or identical driving elements, it should be recognized that the securing means for the two driving elements may be slightly different. For example, the frame 46 may be secured to the driving element 44 by screws extending from the frame 46 into spacer rivets in the core structure of the driving element 44, and the driving element 44 may be secured to the base 41 by screws extending through lugs mounted on the driving element 44, both of these securing means being disclosed in my copending application above mentioned. So that the driving element 48 may be removed more easily from the front of the meter, it may be preferred that it be secured to the frame 46 by lugs 81 which may be identical with the lugs by which the element 44 is secured to the base, except for being mounted on the opposite side of the core structure, i. e., the side toward the axis of the disk.

With any embodiment of the invention illustrated diagrammatically in Fig. 1, an extremely compact and inexpensive polyphase meter may be constructed. Although it may not be as cheap and compact as the polyphase meter using an interference-proof disc, it has the advantage of permitting more ready balancing of the discs and makes double use of a single damping magnet.

The specific arrangement of the parts of my invention illustrated in Fig. 2 is especially advantageous, since it takes up no more wall space than a single phase meter, and likewise no more wall space than a polyphase meter with an interference-proof disc, while at the same time it permits the use of the conventional driving elements. It should be understood that the driving elements are the key to the accuracy of a meter and that, once a manufacturer has developed a driving element which satisfactorily meets the numerous requirements for accuracy and which at the same time can be constructed economically, his ability to use this driving element in a compact polyphase meter is extremely desirable.

Although but one embodiment of my invention has been herein shown and described, it is to be understood that the invention is not limited thereby, but is to be limited only by the prior art. The following claims are intended to point out some of the features now recognized as new, rather than to limit the invention to these features.

I claim:

1. A watt-hour meter including a plurality of driving elements, a disc for each element, each of said discs being mounted on a rotatable shaft, and said discs radially overlapping one another paritially to provide in a minimum of space independent discs on which conventional driving elements may act, and a damping magnet positioned adjacent the overlapping portions of said discs and acting on both of them simultaneously.

2. A watt-hour meter including a plurality of driving elements, a disc for each element, each of said discs being mounted on a rotatable shaft, and said discs radially overlapping one another partially to provide in a minimum of space independent discs on which conventional driving elements may act, and damping magnet means positioned adjacent the overlapping portions of said discs and acting on both of them simultaneously, said damping magnet means being adjustable by movement relatively farther from the center of one disc and relatively closer to the center of the other disc for properly proportioning the damping effects on the two discs.

3. A watt-hour meter including a plurality of driving elements, a disc for each element, each of said discs being mounted on a rotatable shaft, and said discs radially overlapping one another partially to provide in a minimum of space independent discs on which conventional driving elements may act, and a damping magnet positioned adjacent the overlapping portions of said discs and acting on both of them simultaneously, said damping magnet means being adjustable by movement relatively farther from the center of one disc and relatively closer to the center of the other disc for properly proportioning the damping effects on the two discs, and said damping means also being adjustable to control its total damping effect while maintaining undisturbed the proportioning of the damping effect between the two discs.

4. A polyphase watt-hour meter including a base, a driving element secured to said base, frame means secured to said driving element and extending forwardly from said base, a plurality of partially overlapping discs rotatably mounted in said frame and positioned one in front of the other with the rear disc driven by said driving element, and a second driving element carried by said frame acting on the front side of the forward disc.

5. A watt-hour meter including a base, a driving element secured to said base, frame means secured to said driving element and extending forwardly from said base, a plurality of partially overlapping discs rotatably mounted in said frame and positioned one in front of the other with the rear disc driven by said driving element, and a second driving element carried by said frame acting on the front side of the forward disc, and a damping magnet carried by said frame adjacent the overlapping portions of said discs and acting on both of them.

6. A watt-hour meter including a base, a driving element secured to said base, frame means secured to said driving element and extending forwardly from said base, a plurality of partially overlapping discs rotatably mounted in said frame and positioned one in front of the other with the rear disc driven by said driving element, and a second driving element carried by said frame acting on the front side of the forward disc, and common permanent damping magnet means positioned adjacent the overlapping portions of said discs and acting on both of them simultaneously, said damping magnet means being adjustable by movement relatively farther from the center of one disc and relatively closer to the center of the other disc for properly proportioning the damping effects on the two discs.

7. A watt-hour meter including a base, a driving element secured to said base, frame means secured to said driving element and extending forwardly from said base, a plurality of partially overlapping discs rotatably mounted in said frame and positioned one in front of the other with the rear disc driven by said driving element, and a second driving element carried by said frame acting on the front side of the forward disc, common permanent damping magnet means positioned adjacent the overlapping portions of said discs and acting on both of them simultaneously, said damping magnet means being adjustable by movement relatively farther from the center of one disc and relatively closer to the center of the other disc for properly proportioning the damping effects on the two discs, and said damping means also being adjustable to control its total damping effect while maintaining undisturbed the proportioning of the damping effect between the two discs.

8. A watt-hour meter including a base, a driving element secured to said base, frame means secured to said driving element and extending forwardly from said base, a plurality of partially overlapping discs rotatably mounted in said frame and positioned one in front of the other with the rear disc driven by said driving element, and a second driving element carried by said frame acting on the front side of the forward disc, and a damping magnet carried by said frame on one side of said discs adjacent the overlapping portions of said discs and acting on both of them, and a magnetic armature positioned opposite said damping magnet adjacent the opposite face of an overlapped disc portion.

9. A watt-hour meter including a base, a driving element secured to said base, frame means secured to said driving element and extending forwardly from said base, a plurality of partially overlapping discs rotatably mounted in said frame and positioned one in front of the other with the rear disc driven by said driving element, and a second driving element carried by said frame acting on the front side of the forward disc, and a damping magnet carried by said frame on one side of said discs adjacent the overlapping portions of said discs and acting on both of them, and a magnetic armature positioned opposite said damping magnet adjacent the opposite face of an overlapping disc portion, said armature being adjustable by movement relatively farther from the center of one disc and relativley closer to the center of the other disc for properly proportioning the damping effects on the two discs.

10. A polyphase watt-hour meter including a base and a measuring unit secured to said base; said measuring unit including a plurality of driving elements, a disc for each of said elements adapted to be driven thereby and mounted for continuous rotation, said discs radially overlapping one another partially and being positioned one in front of the other with respect to said base whereby said base may be of a size to take up a minimum amount of wall space, and common permanent magnet means for inductively retarding both discs.

11. A watt-hour meter including a driving element; a disc mounted for continuous rotation and adapted to be driven thereby; and damping magnet means including a damping magnet permanently positioned with its poles fixed adjacent one face of the disc, and an armature adjacent the other face of the disc opposite said poles and having at least one end movable substantially radially of the disc for radially shifting flux cutting the disc, said armature being of such size, shape and position with respect to the poles that in spite of its radial movement it maintains substantially constant permeance in the path between the poles through the armature whereby the damping torque may be adjusted simply by moving said armature without substantially decreasing or increasing the flux passing through the armature.

12. A polyphase watt-hour meter including a plurality of driving elements, a disc for each element, each of said discs being mounted on a rotatable shaft and adapted to rotate continuously and independently, and said discs radially overlapping one another partially in close proximity to provide in a minimum of space independent discs on which conventional driving elements may act, and common permanent magnet damping means for inductively retarding both discs.

13. A polyphase watt-hour meter including a plurality of driving elements, a disc for each element, each of said discs being mounted on a rotatable shaft and adapted to rotate continuously, and said discs radially overlapping one another partially in close proximity to provide in a minimum of space independent discs on which conventional driving elements may act, and common permanent magnet means for inductively retarding both discs, a single register and a differential gearing having its driven gear driving said register and its driving gears each driven by one of said discs.

14. A watt-hour meter including two independent driving elements, a disc for each driving element, the discs being mounted for continuous rotation and overlapping one another partially, and damping magnet means including a damping magnet positioned with its poles fixed adjacent one face of an overlapping disc portion, and an armature adjacent the opposite face of an overlapping disc portion and in part, at least, movable substantially radially of the discs for balancing the damping torques of the discs as compared to the strength of the driving elements, said armature being of such size, shape and position with respect to the poles that in spite of its radial movement for balancing the torques it maintains the total torque on the two discs substantially constant.

15. A watt-hour meter including rotary driven means, two driving units adapted to drive said driven means, damping magnet means for retarding the driven means to measure accurately the total power consumed by the circuits connected to both driving units, and means operable by a single control means for balancing the relative meter accuracy as between the two driving units by increasing the ratio of the effectiveness of one driving unit to the effectiveness of the retarding means and simultaneously decreasing the ratio of the effectiveness of the other driving unit to the effectiveness of the retarding means while maintaining substantially constant the accuracy of the meter as to the total energy measured.

STANLEY S. GREEN.